United States Patent [19]

Nushi et al.

[11] Patent Number: 4,606,749
[45] Date of Patent: Aug. 19, 1986

[54] APPARATUS FOR AND METHOD OF BENDING GLASS SHEETS

[75] Inventors: Masaaki Nushi; Naohiro Iida, both of Tokyo, Japan

[73] Assignee: Nippon Sheet Glass Co., Ltd., Osaka, Japan

[21] Appl. No.: 780,688

[22] Filed: Sep. 26, 1985

[30] Foreign Application Priority Data

Sep. 26, 1984 [JP] Japan .................. 59-201200

[51] Int. Cl.⁴ ............................................. C03B 23/03
[52] U.S. Cl. ........................................ 65/106; 65/273; 65/287; 65/289; 65/290
[58] Field of Search ................. 65/106, 107, 273, 287, 65/289, 290

[56] References Cited

U.S. PATENT DOCUMENTS

| | | | |
|---|---|---|---|
| 4,204,854 | 5/1980 | McMaster et al. | 65/273 X |
| 4,305,746 | 12/1981 | Hagedorn et al. | 65/106 |
| 4,501,603 | 2/1985 | Frank et al. | 65/290 X |
| 4,508,556 | 4/1985 | Bennett et al. | 65/273 X |
| 4,529,433 | 7/1985 | Bennett et al. | 65/273 |

*Primary Examiner*—Arthur Kellogg
*Attorney, Agent, or Firm*—Lowe, Price, Leblanc, Becker & Shur

[57] ABSTRACT

A glass sheet bending apparatus has a lower mold and conveyor rolls for conveying a heated glass sheet horizontally to a position over the lower mold, the lower mold having slots for receiving the conveyor rolls when the lower mold is lifted. The glass sheet bending apparatus has a main ring mold disposed around the outer peripheral surface of the lower mold which has a first shaping surface for shaping the central area of the glass sheet, the main ring mold having a second shaping surface for shaping the peripheral edge of the glass sheet. The glass sheet bending apparatus also has an auxiliary ring mold disposed between the main ring mold and the lower mold and having a substantially horizontal, flat support surface for supporting the glass sheet between the central area and peripheral edge of the glass sheet. The auxiliary ring mold is lifted prior to the upward movement of the lower mold and the main ring mold for raising the glass support off the conveyor rolls with its support surface. There is also disclosed a method of bending a glass sheet.

11 Claims, 19 Drawing Figures

APPARATUS FOR AND METHOD OF BENDING GLASS SHEETS

BACKGROUND OF THE INVENTION

1. Field of the invention

The present invention relates to an apparatus for and a method of bending a glass sheet heated to its softening point in a furnace, between upper and lower molds.

2. Description of the Prior Art

Various methods and apparatus for producing bent glass sheets for use in automobiles have been known in the art. In such known methods and apparatus, the glass sheet is heated in a furnace to its softening point, and the heated glass sheet is fed horizontally by conveyor rolls to a bending station in which the glass sheet is bent to desired shape. U.S. Pat. Nos. 3,476,540 and 3,554,724 to Ritter, Jr., et al reveal glass sheet bending apparatus in which when a heat softened glass sheet is deposited on conveyor rolls in the bending apparatus, a ring-type lower mold member is moved upwardly to cause the glass sheet to sag into conformity with the shaping surface of the lower mold member under inertial and gravitational forces on the glass sheet. U.S. Pat. No. 3,734,706 to Ritter, Jr. discloses a glass sheet bending apparatus including a rapid quenching device for rapidly chilling and tempering a glass sheet as it is bent in the same manner as described above.

In the disclosed apparatus in which the glass sheet is raised off the conveyor rolls by the ring-type lower mold, the glass sheet sags or flexes in its central area heated to the softening point under inertial forces since the ring-shaped shaping surface of the lower mold is inclined towards its center in conformity with the shape of the concave glass sheet. The central area of the glass sheet having the inertia-induced sag remains in contact with the conveyor rolls for a prolonged period of time. Those portions of the glass sheet which are kept in contact with the conveyor rolls are cooled more rapidly than the other glass sheet portions, and are subject to optical defects. U.S. Pat. Nos. 4,197,108 and 4,272,274 to Frank et al show apparatus in which a lower shaping mold is not ring-shaped, but is composed of a solid block having a plurality of elongated shaping members over its entire surface, and the lower shaping mold is lifted to raise the glass sheet off the conveyor rolls for bending the glass sheet on the lower shaping mold. However, inasmuch as the peripheral edge portion of the concave shaping surface of the lower shaping mold, which edge portion is the first surface for the glass sheet to contact, is inclined toward the center of lower shaping mold, the heated glass sheet also tends to sag at its central area under inertial forces when the glass sheet is lifted.

The present invention has been made in an effort to eliminate the aforesaid shortcomings of the conventional apparatus and methods.

SUMARY OF THE INVENTION

It is an object of the present invention to reduce any inertia-induced sag of a heat softened glass sheet at its central area as much as possible for shortening the time period in which the glass sheet remains in contact with conveyor rolls, thereby reducing optical defects eventually produced in the bent glass sheet.

According to the present invention, the above object can be achieved by an apparatus for bending a glass sheet, comprising a vertically movable lower mold having a first upwardly facing shaping surface for shaping the central area of the glass sheet, a plurality of conveyor rolls for conveying the glass sheet as heated horizontally to a prescribed position over the first shaping surface, means in the lower mold for accommodating the conveyor rolls when the lower mold is moved upwardly, a vertically movable main ring mold disposed around the lower mold in spaced relation to the outer peripheral surface thereof, the main ring mold having a second downwardly facing shaping surface for shaping the peripheral edge of the glass sheet, means in the main ring mold for accommodating the conveyor rolls when the main ring mold is moved upwardly, an auxiliary ring mold vertically movably disposed between the lower mold and the main ring mold, the auxiliary ring mold having an upwardly facing support surface for supporting the glass sheet between the central area and peripheral edge thereof, and means in the auxiliary ring mold for accommodating the conveyor rolls when the auxiliary ring mold is moved upwardly.

The upwardly facing support surface of the auxiliary ring mold is substantially flat horizontally.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
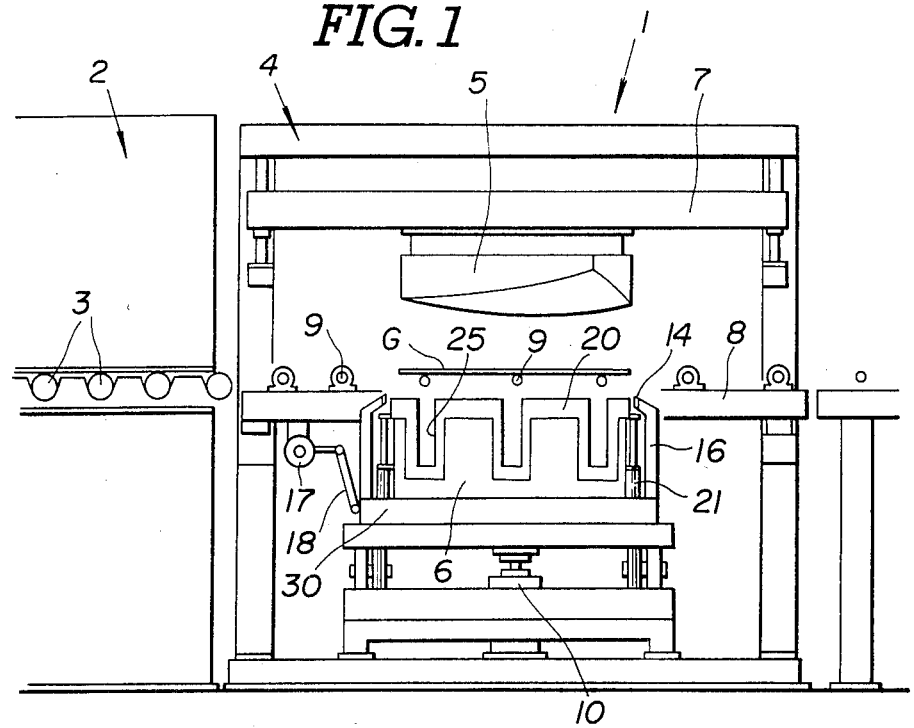
FIG. 1 is a front elevational view of a glass sheet bending apparatus according to the present invention.
Figure 2:
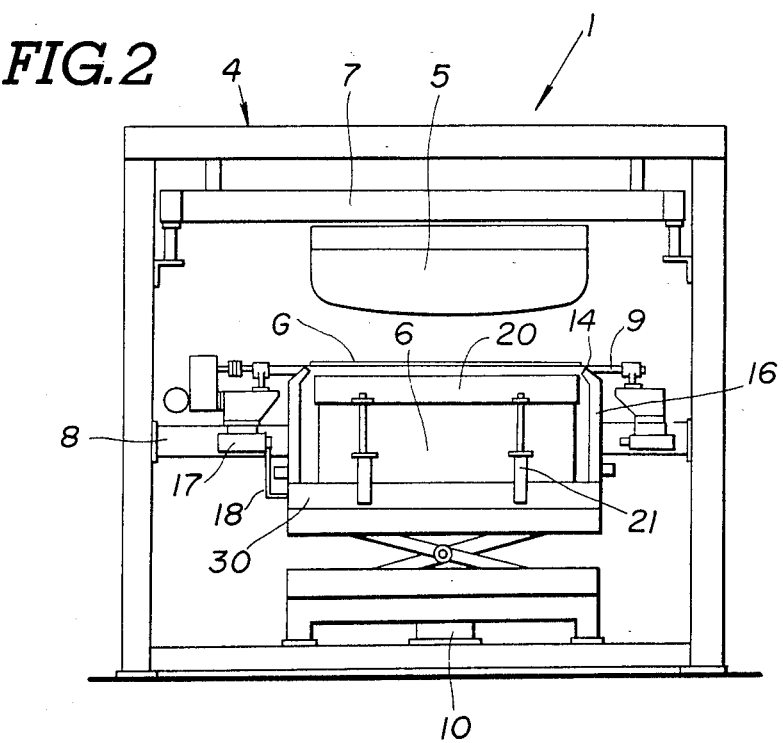
FIG. 2 is a side elevational view of the glass sheet bending apparatus shown in FIG. 1.

As shown in FIGS. 1 and 2, a glass sheet bending apparatus 1 according to the present invention is positioned adjacent to a furnace 2 having a plurality of conveyor rolls 3 for conveying a heated glass sheet G toward the bending apparatus 1.

The bending apparatus 1 has a frame 4 housing therein an upper mold (convex mold) 5 and a lower mold (concave mold) 6. The upper mold 5 is fixed to a support plate 7 movable or positionally adjustable upwardly and downwardly by a motor or a fluid cylinder unit (not shown). Roll support beams 8, 8 are fixed horizontally to the frame 2 at a vertically intermediate position, and conveyor rolls 9 are rotatably mounted on and extend between the roll support beams 8, 8, the conveyor rolls 9 having axes extending perpendicularly to the direction of travel of the glass sheet G through the bending apparatus 1.

The lower mold 6 is movable upwardly and downwardly by a fluid cylinder unit 10 mounted on the bottom of the frame 4 or a floor. The lower mold 6 is illustrated in greater detail in FIGS. 3 through 5.

Figure 3:
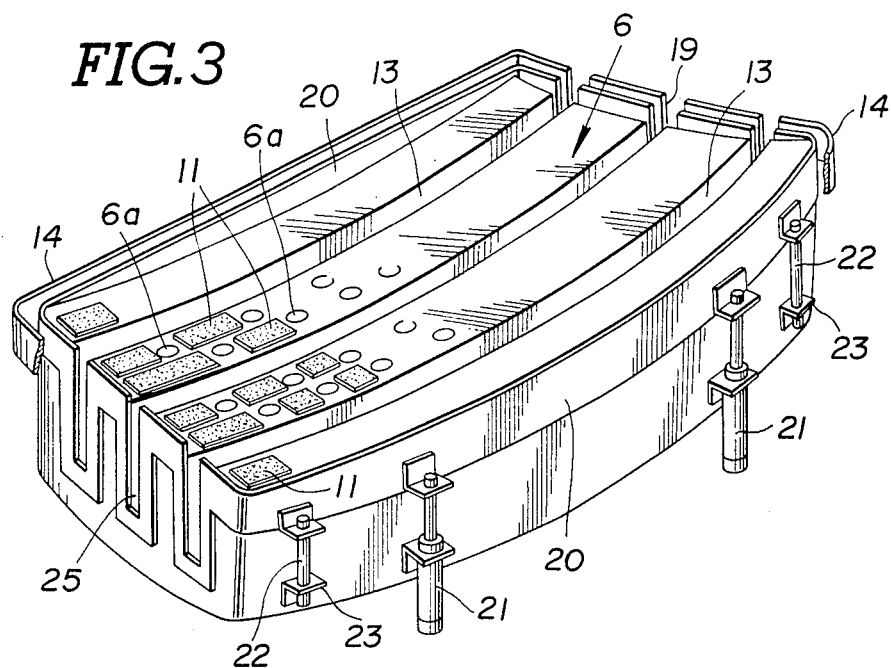
FIG. 3 is a perspective view of a lower mold, a ring mold, and an auxiliary ring mold.
Figure 4:
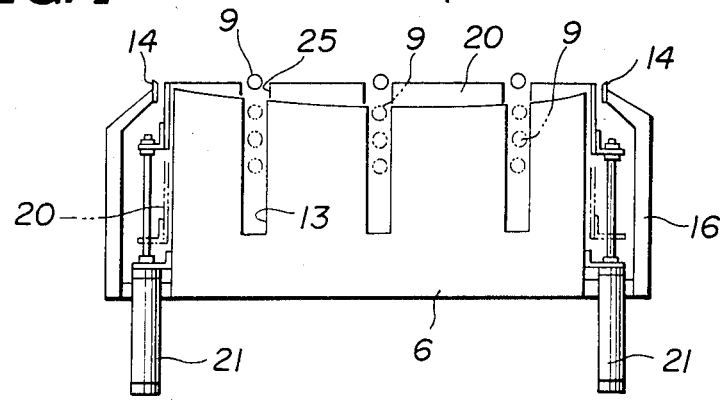
FIG. 4 is a front elevational view showing the positional relationship between the lower mold and conveyor rolls.
Figure 5:
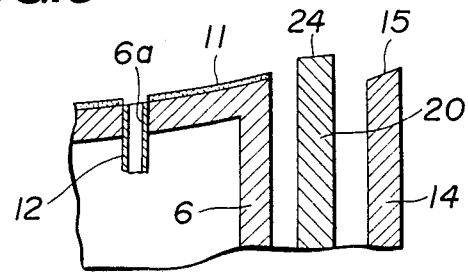
FIG. 5 is an enlarged fragmentary cross-sectional view illustrating the positional relationship between the lower mold, the ring mold, and the auxiliary ring mold.

As shown in FIGS. 3 through 5, the lower mold 6 is in the form of a hollow structure for introducing cooling air therein (FIG. 5) and has its substantially entire upper surface serving as a concave shaping surface to which thermal insulating members 11 such as glass fiber mats are attached. The shaping surface of the lower mold 6 has a plurality of holes 6a opening upwardly. As shown in FIG. 5, the lower mold 4 has a plurality of cooling nozzles 12 disposed respectively in the holes 6a for blowing cooling air against the glass sheet when it is bent. The nozzles 12 may be integral with the lower mold 6. The nozzles 12 may be of any structure insofar as their tip ends do not project upwardly beyond the shaping surface of the lower mold 6 or the surfaces of the thermal insulating members 11. Although not shown, the upper mold 5 is also of a hollow structure having substantially its entire lower surface serving as a convex shaping surface to which thermal insulating members are attached and which has cooling nozzles in the same manner as the lower mold 6.

The lower mold 6 has a plurality of vertical slots 13 positioned out of interference with the nozzles 12 and extending fully transversely across the lower mold 6 to divide the shaping surface into segments, the slots 13 opening upwardly. When the lower mold 6 is lifted, the conveyor rolls 9 enter the slots 13, respectively.

A main ring mold 14 is disposed around the lower mold 6 in spaced relation to the outer peripheral surface thereof. The ring mold 14 serves to shape the peripheral edge of the glass sheet G against the upper mold 5 when the glass sheet G is pressed between the upper and lower molds 5, 6. The ring mold 14 has an upper end surface 15 inclined inwardly in conformity with the shape of the peripheral edge of the glass sheet G. As shown in FIGS. 1 and 4, the ring mold 14 is fixed to the upper ends of arms 16 of an oscillation device. The arms 16 are fixedly mounted on a reciprocally movable bed 30 which can be driven by a motor 17 through a link mechanism 18. When the motor 17 is energized, the ring mold 14 is reciprocally moved in a linear or circular pattern. The oscillation device serves to temper the glass sheet G uniformly by allowing cooling air to be blown uniformly against the surface of the glass sheet G from the upper and lower molds 5, 6 while the glass sheet as bent is held by the ring mold 14 between the upper and lower molds 5, 6. The ring mold 14, which is movable upwardly and downwardly independently of the lower mold 6, has recesses 19 for receiving the conveyor rolls 9 therein when the ring mold 14 is moved upwardly with respect to the lower mold 6.

Between the ring mold 14 and the lower mold 6, there is disposed an auxiliary ring mold 20 movable upwardly and downwardly by a fluid cylinder unit 21 independently of the lower mold 6 and the ring mold 14. Since the auxiliary ring mold 20 has a plurality of pins 22 extending through guide members 23 attached to the lower mold 6, the auxiliary ring mold 20 can be moved upwardly and downwardly while keeping a constant gap between the outer peripheral surface of the lower mold 6 and the inner peripheral surface of the auxiliary ring mold 20. The auxiliary ring mold 20 is not involved in bending the glass sheet G, but serves to support the glass sheet G between its central area and peripheral edge for allowing the glass shet G to be picked up from the conveyor rolls 9. Therefore, the upper end surface of the auxiliary ring mold 20 is substantially flat horizontally. Since the auxiliary ring mold 20 is also independently movable upwardly and downwardly, it has recesses 25 for receiving the conveyor rolls 9 therein. When the lower mold 6, the ring mold 14 and, the auxiliary ring mold 20 are in the lowest position, the slots 13 and the recesses 19, 25 are aligned with each other when seen in front elevation.

Figure 6:
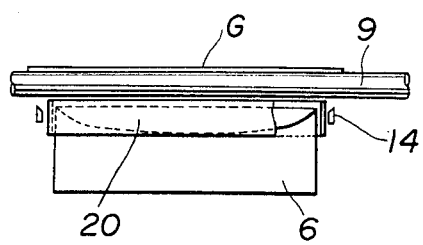
FIGS. 6(A) through 6(E) are side elevational views of a shaping station, showing the progressive steps of a glass sheet bending process according to the present invention.
Figure 6:
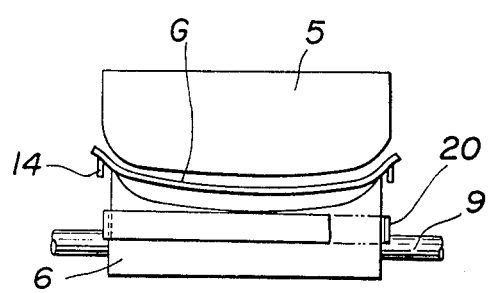
Figure 6:
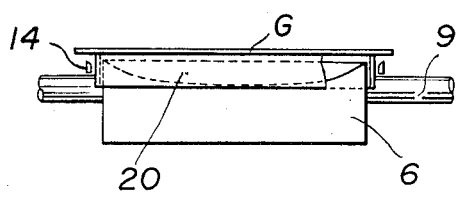
Figure 6:
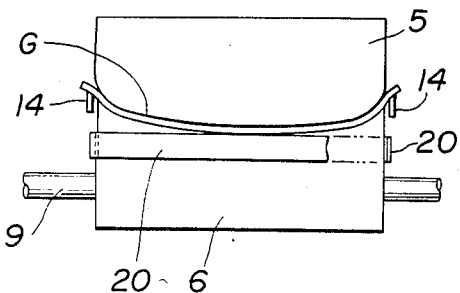
Figure 6:
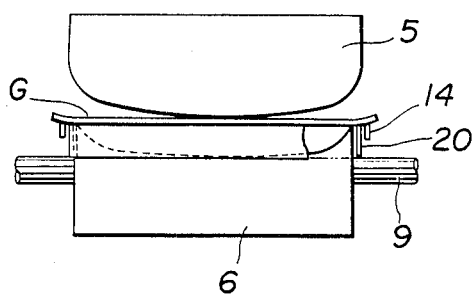

Operation of the glass sheet bending apparatus of the foregoing construction for bending and tempering the glass sheet G will be described with reference to FIG. 6.

The glass sheet G as it is heated to its softening point is fed from the furface 2 over the conveyor rolls 3, 9 into the bending station between the upper and lower molds 5, 6. At this time, the lower mold 6, the ring mold 14, and the auxiliary ring mold 20 are positioned below the conveyor rolls 9 as shown in FIG. 6(A). The upper end of the auxiliary ring mold 20 is positioned upwardly of the upper surface of the lower mold 6 and the ring mold 14.

Then, the auxiliary ring mold 20, the lower mold 6, and the ring mold 14 are lifted as shown in FIG. 6(B). Since the upper end of the auxiliary ring mold 20 is higher than the lower mold 6 and the ring mold 14, the glass sheet G is lifted off the conveyor rolls 9 by the auxiliary ring mold 14.

When the glass sheet G held by the auxiliary ring mold 14 is raised closely to the lower surface of the upper mold 5, the upward movement of the auxiliary ring mold 20 is arrested, and the lower mold 6 and the ring mold 14 are continuously lifted to receive the glass sheet G from the auxiliary ring mold 20. As illustrated in FIG. 6(D), the auxiliary ring mold 20 is lowered after the glass sheet G has been transferred therefrom to the lower mold 6 and the ring mold 14.

Thereafter, as shown in FIG. 6(E), the glass sheet G is pressed and bent to the desired shape between the upper mold 5 and the lower mold 6 together with the ring mold 14. The central area of the glass sheet G is shaped between the upper and lower molds 5, 6, and the peripheral edge of the glass sheet G is shaped between the ring mold 14 and the upper mold 5.

Then, the lower mold 6 and the ring mold 14 are lowered. At this time, the lower mold 6 is lowered a greater distance than the ring mold 14 such that if the lower mold 6 is lowered 50 mm, for example, then the ring mold 14 is lowered 25 mm. Therefore, the glass sheet G as it is placed on the ring mold 14 is held intermediate between the upper mold 5 and the lower mold 6. Thereafter, air is ejected from the nozzles on the upper and lower molds 5, 6 against the surfaces of the glass sheet G. At the same time, the oscillation device is operated to reciprocally move the ring mold 14 and the glass sheet G thereon in a linear or circular pattern to permit the air to be applied evenly to the surfaces of the glass sheet G for thereby uniformly quenching and tempering the glass sheet G.

While in the above embodiment the lower mold 6, the ring mold 14, and the auxiliary ring mold 20 are simultaneously lifted, only the auxiliary ring mold 20 may first be lifted, and then the lower mold 6 and the ring mold 14 may thereafter be raised. With this movement pattern, the upper end of the auxiliary ring mold 20 before it is lifted may not necessarily be positioned above the upper surface of the lower mold 6 and the upper end of the ring mold 14.

FIGS. 7 through 13 illustrate a modified oscillation device which may be incorporated in the bending apparatus shown in FIGS. 1 through 6. Although the oscillation device of FIGS. 1 through 6 has the single movable bed 30 mounted on its base, the modified oscillation device has a pair of movable plates supported respectively on roll support beams disposed on the opposite sides of the glass sheet feed line.

Figure 7:
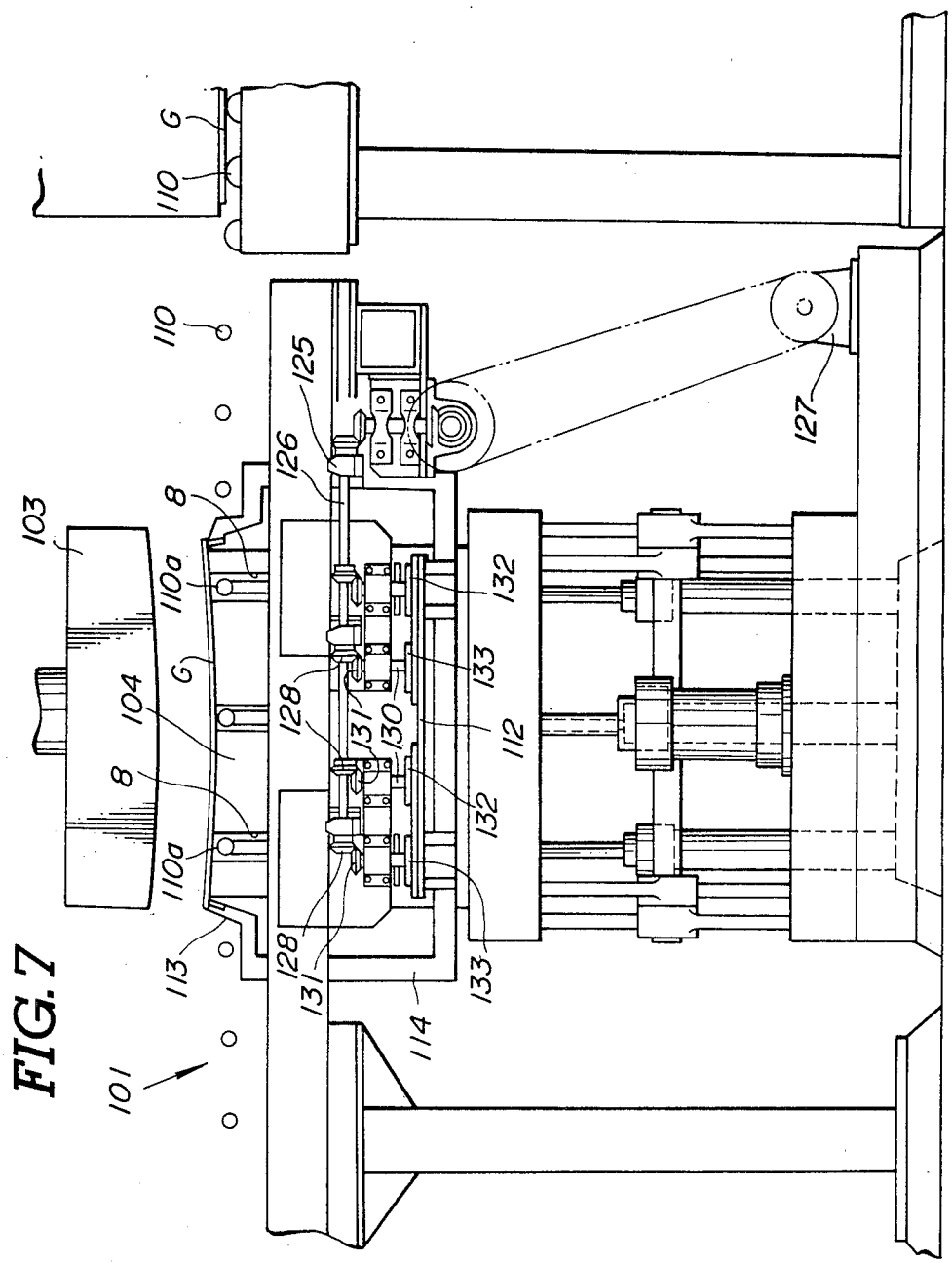
FIG. 7 is a front elevational view of a glass sheet bending apparatus incorporating another oscillation device.
Figure 8:
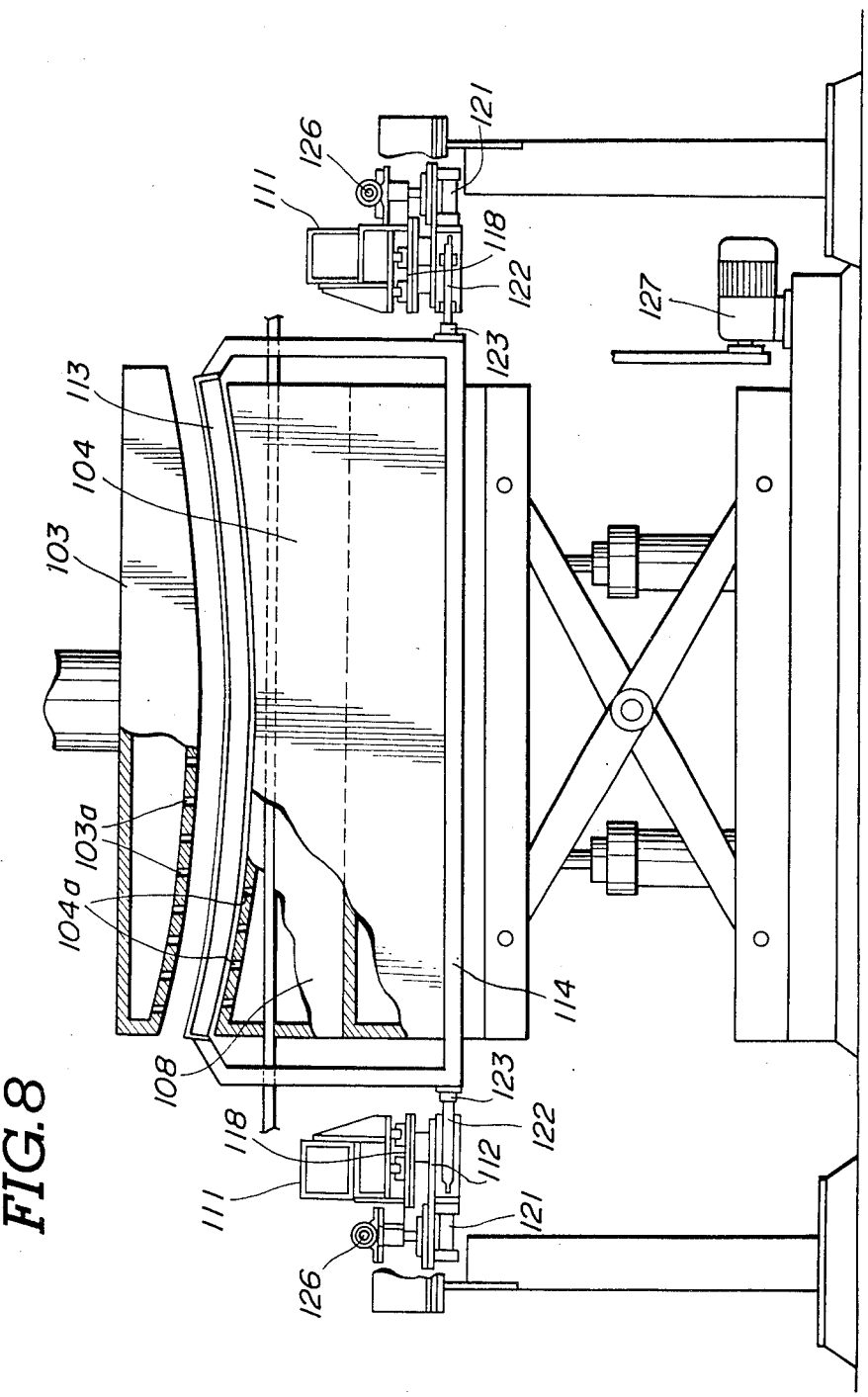
FIG. 8 is a side elevational view, partly in cross section, of the glass sheet bending apparatus shown in FIG. 7.

As shown in FIGS. 7 and 8, a substantially ring-shaped mold 113 is disposed on the upper end of a support frame 114 extending around a lower mold 104. The mold 113 has open lateral sides so that it will not interfere with conveyor rolls 110a when it is moved upwardly with the lower mold 104.

Figure 9:
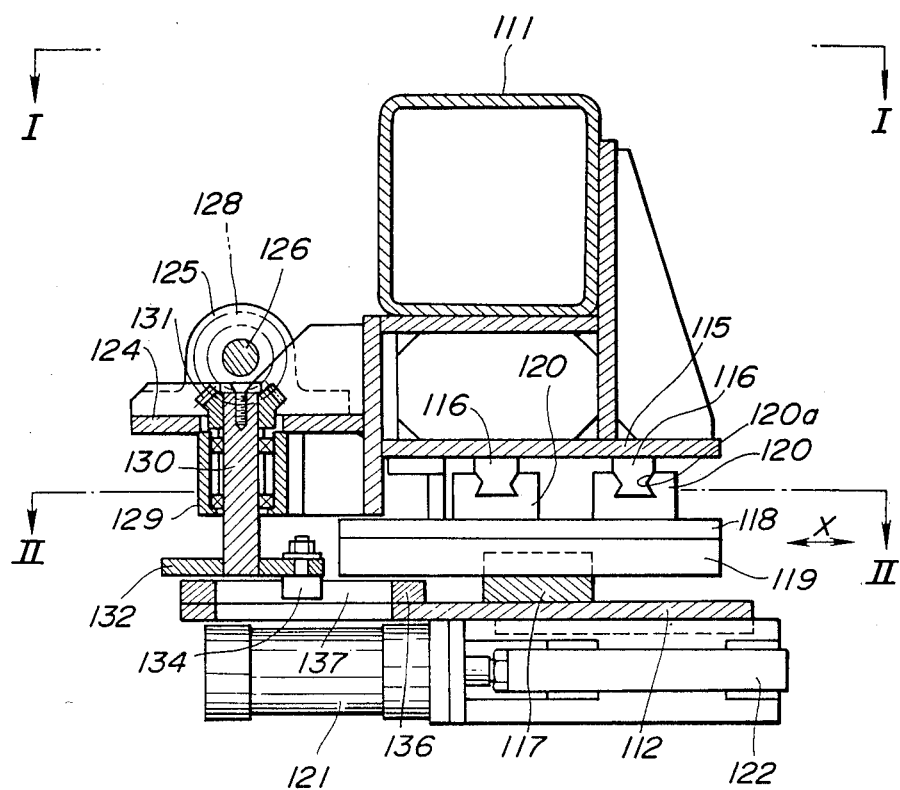
FIG. 9 is an enlarged cross-sectional view of a portion of the glass sheet bending apparatus illustrated in FIG. 8.
Figure 10:
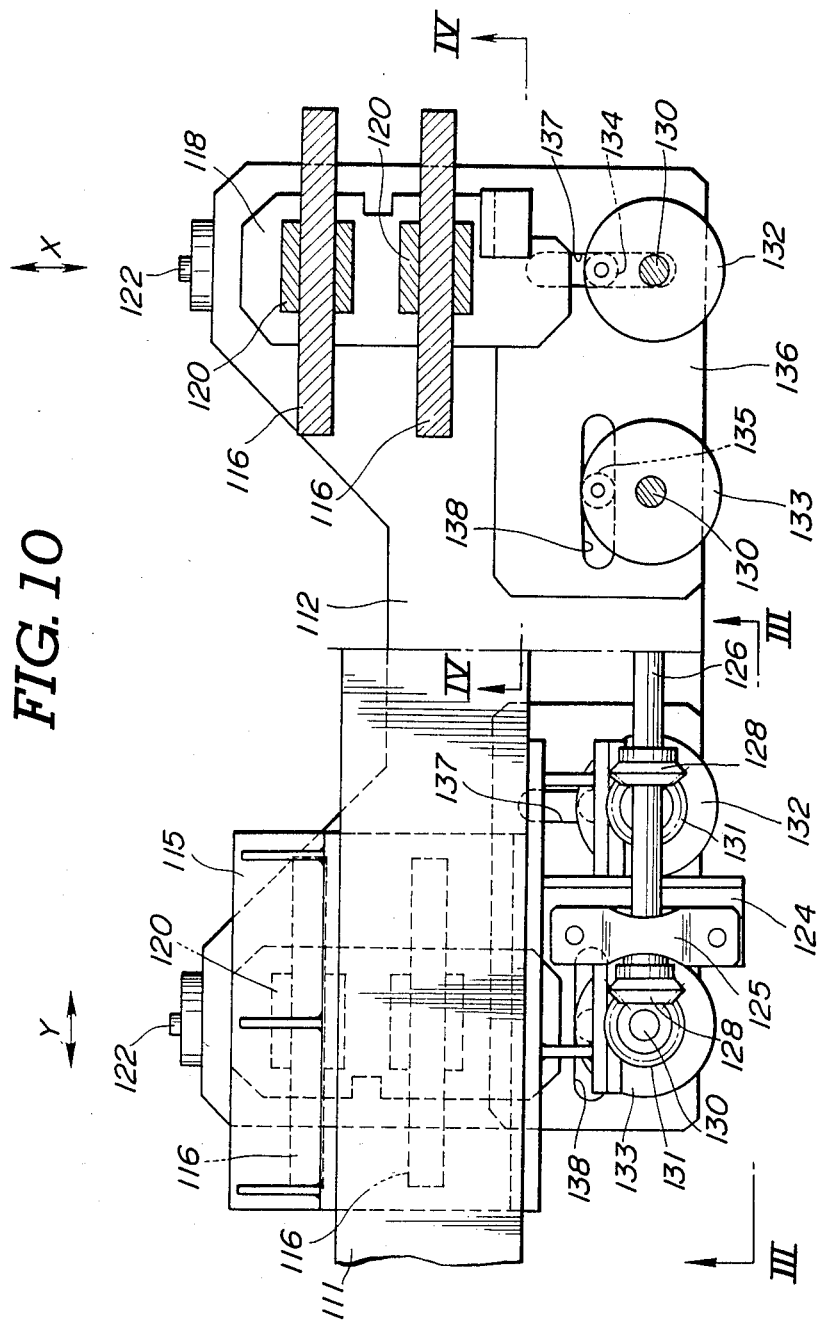
FIG. 10 is a plan view of the structure illustrated in FIG. 9, with the lefthand half viewed from the plane I and the righthand half viewed from the plane II.
Figure 11:
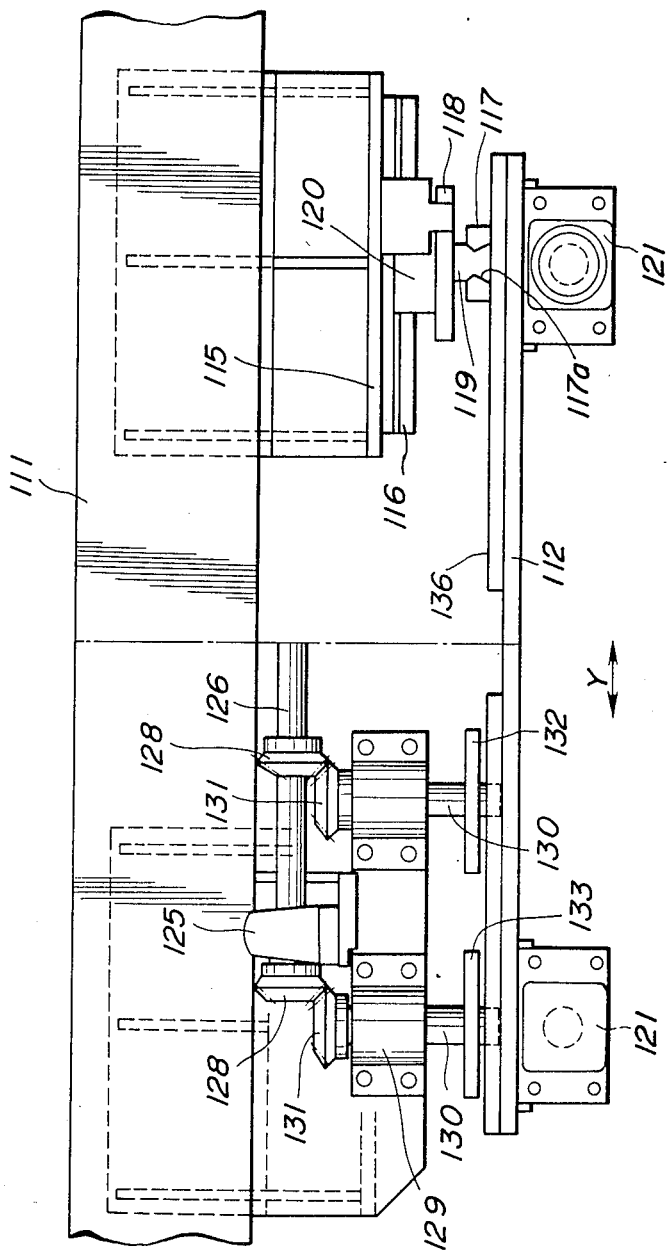
FIG. 11 is a front elevational view of the structure of FIG. 10, with the lefthand half viewed from the plane III and the righthand half viewed from the plane IV.

A pair of movable plates 112 and a mechanism for moving the movable plates 112 are shown in FIGS. 9 through 11.

Each of the movable plates 112 is supported on a support beam 111 for movement in the directions of the arrows X, Y. More specifically, a stationary plate 115 is fixed to the support beam 111 exteding along the glass sheet feed path in a bending apparatus 101 (FIG. 7). Rails 116 are secured to the underside of the stationary plate 115 and extend in the direction of the arrow Y. A rail guide 117 extending in the direction of the arrow X is attached to the upper side of the movable plate 112. The rails 116 and the rail guide 117 are slidably fitted in and over an intermediate member 118 disposed between the stationary plate 115 and the movable plate 112. The intermediate member 118 has a rail 119 extending in the direction of the arrow X and rail guides 120 having guide grooves 120a extending in the direction of the arrow Y. The rail 119 is slidably fitted in the guide groove 117a in the rail guide 117, and the rails 116 are slidably fitted in the guide grooves 120a, respectively, in the rail guides 120. The rails 116, 119 have a cross-sectional shape with a constricted intermediate portion, and the guide grooves 117a, 120a have a complementary cross-sectional shape.

The movable plate 112 is thus supported on the beam 111 for movements in the directions of the arrows X, Y. The movable plate 112 can therefore be moved in a circular or elliptical horizontal pattern resulting from the combined movements in directions of the arrows X, Y.

Figure 12:
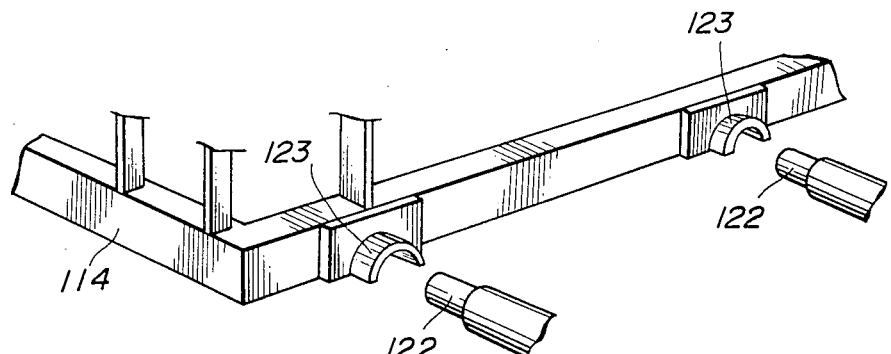
FIG. 12 is a fragmentary perspective view of a mechanism by which a ring mold support frame is held in engagement with rods.

A fluid cylinder unit 121 is fixed to the lower side of the movable plate 112 for moving a rod 122 in the transverse direction of the bending apparatus. As shown in FIG. 12, each of the rods 122 as it projects engages a retainer 123 on the support frame 114 of the ring mold 113 to hold the support frame 114 on the movable plate 112.

Stationary plates 124 are fixed to the support beam 111. A drive shaft 126 extending parallel to the support beam 111 is rotatably supported by bearings 125 mounted on the stationary plate 24. As shown in FIG. 7, the drive shaft 126 is rotatable by a motor 127 mounted on the bottom of the bending apparatus 101. A plurality (four in the illustrated embodiment) of helical gears 128 are fitted over the drive shaft 126 at spaced intervals therealong.

A plurality (four in the illustrated embodiment) of bearings 129 are mounted on the lower side of the stationary plates 124, and vertically extending shafts 130 are rotatably supported by the bearings 129, respectively. The shafts 130, four in number on each side of the glass sheet feed path, support helical gears 131 respectively on their upper ends, which are held in mesh with helical gears 128, respectively, on the drive shaft 126. Therefore, rotation of the drive shaft 126 can be transmitted through the helical gears 128, 131 to the shafts 130.

As illustrated in FIG. 10, two pairs of first and second rotors 132, 133 are fitted over the lower ends of the shafts 130, the first and second rotors 132, 133 in each pair supporting pins 134, 135 extending axially and positioned in eccentric relation to the shafts 130.

A pair of guide plates 136 mounted on the upper surface of the movable plate 112. Each of the guide plates 136 has a slot 137 extending in the direction of the arrow X and a slot 138 extending in the direction of the arrow Y. The pin 134 on the first rotor 132 has a lower end movably engaging in the slot 137, whereas the pin 135 on the second rotor 133 has a lower end movably engaging in the slot 138.

Operation of the oscillation device of the above construction will be described primarily with reference to FIG. 13. In FIG. 13, only one of the guide plates 136 and one pair of first and second rotors 132, 133 thereon are illustrated for the sake of brevity.

Figure 13A:
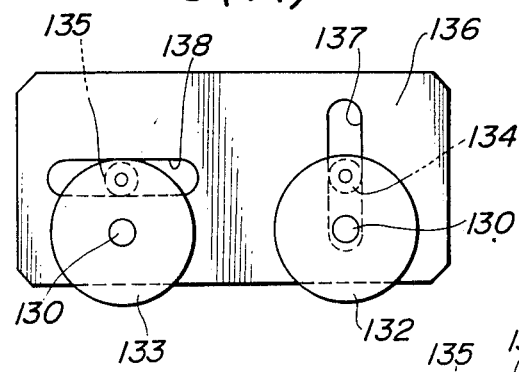
FIGS. 13(A) through 13(c) are schematic plan views showing operation of the oscillation device.
Figure 13B:
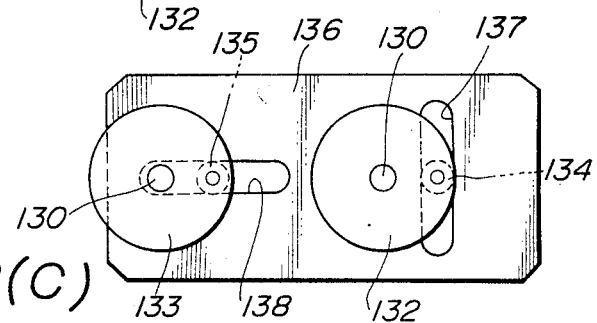
Figure 13C:
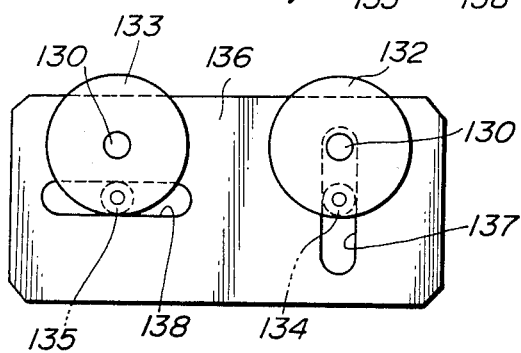

It is assumed that the guide plate 136 and the rotors 132, 133 are initially positioned as shown in FIG. 13(A). The motor 127 is energized to rotate the drive shaft 126. The rotation of the drive shaft 126 is transmitted via the helical gears 128, 131 to the shafts 130 and the first and second rotors 132, 133 mounted thereon. When the first rotor 132 is rotated clockwise (FIG. 13(A)), the guide plate 136 is moved to the right from the initial position, and the pin 135 is moved relatively toward the lefthand end of the slot 138 for an interval equal to the distance over which the guide plate 136 is moved to the left. In response to simultaneous clockwise rotation of the second rotor 133, the guide plate 136 is moved downwardly (FIG. 13(A)) from the initial position, and the pin 134 is moved relatively toward the upper end of the slot 137 for an interval equal to the distance over which the guide plate 136 is moved downwardly. As the above movements of the guide plate 136 are combined, the guide plate 136 is moved rightward and downwardly to the position shown in FIG. 13(B). Upon continued clockwise rotation of the rotors 132, 133, the guide plate 136 is moved to the position of FIG. 13(C) and then back to the initial position of FIG. 13(A).

With the pins 134, 135 displaced equally off center from the corresponding shafts 130, the guide plate 136 and the movable plate 112 joined thereto are caused to move in a circular path. Where the pins 134, 135 displaced different distances off center from the associated shafts 130, the guide plate 136 and the movable plate 112 are caused to move in an elliptical path. The size of the circular or elliptical pattern can be varied as desired by changing the distances by which the pins 134, 135 are spaced off center from the shafts 130. However, it is preferable that such off-center distances of the pins 134, 135 from the shafts 130 be selected to allow nozzles 103a, 104a in the upper and lower molds 103, 104 to follow overlapping paths over a glass sheet G when it is quenched by cooling air ejected from the nozzles 103a, 104a.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claims:

1. An apparatus for bending a glass sheet, comprising:
   a vertically movable lower mold having a first, upwardly facing, shaping surface for shaping a central area of the glass sheet;
   a plurality of conveyor rolls for conveying horizontally glass sheet as heated horizontally to a prescribed position over said first shaping surface;
   means in said lower mold for accommodating said conveyor rolls when said lower mold is moved upwardly;
   a vertically movable main ring mold disposed around said lower mold in space relation to an outer peripheral surface thereof, said main ring mold having a second, downwardly facing, shaping surface for shaping a peripheral edge of the glass sheet;
   means in said main ring mold for accommodating said conveyor rolls when said main ring mold is moved upwardly;
   an auxiliary ring mold vertically movably disposed between said lower mold and said main ring mold, said auxiliary ring mold having an upwardly facing support surface for supporting the glass sheet between the central area and peripheral edge thereof; and
   means in said auxiliary ring mold for accommodating said conveyor rolls when said auxiliary ring mold is moved upwardly.

2. An apparatus according to claim 1 wherein said upwardly facing support surface of said auxiliary ring mold is substantially flat horizontally.

3. An apparatus according to claim 1 including first, second, and third means for vertically moving said lower mold, said main ring mold, and said auxiliary ring mold, respectively, independently of each other.

4. An apparatus according to claim 1 wherein said lower mold has means for quenching the shaped glass sheet.

5. An apparatus according to claim 4 including means for horizontally oscillating the shaped glass in cooperation with said quenching means.

6. An apparatus according to claim 1 including a vertically movable upper mold having a third, downwardly facing, shaping surface for shaping the glass sheet in cooperation with said lower mold and said main ring mold.

7. An apparatus according to claim 6 wherein each of said upper and lower molds has means for quenching the shaped glass sheet.

8. A method of bending a glass sheet, comprising:
   conveying a heated glass sheet by a plurality of conveyor rolls to a prescribed position over a first, upwardly facing, shaping surface of a lower mold for shaping a central area of the glass sheet;
   lifting an auxiliary ring mold between said lower mold and a main ring mold having a second, upwardly facing, shaping surface and disposed around said lower mold in spaced relation to an outer peripheral surface thereof, prior to upward movement of said lower mold;
   raising said glass sheet off said conveyor rolls by a substantially horizontal upwardly facing flat support surface of said auxiliary ring mold;
   arresting upward movement of said auxiliary ring mold;
   lifting said lower mold and said main ring mold to transfer the glass sheet from said support surface of the auxiliary ring mold to said first and second shaping surfaces of said lower mold and said main ring mold;
   lowering said auxiliary ring mold; and
   shaping the central area of the glass area on said first shaping surface of the lower mold and shaping a peripheral edge of the glass sheet on said second shaping surface of the main ring mold.

9. A method according to claim 8 including the step of quenching the shaped glass sheet.

10. A method according to claim 9 including the step of horizontally oscillating the shaped glass sheet simultaneously with the quenching step.

11. A method according to claim 8 wherein the glass sheet is shaped on said first and second shaping surfaces of said lower mold and said main ring mold in cooperation with a third downwardly facing shaping surface of an upper mold.

* * * * *